United States Patent
Tseng et al.

[11] Patent Number: 5,907,730
[45] Date of Patent: May 25, 1999

[54] MOVEABLE LENS APPARATUS FOR DIGITAL CAMERA

[75] Inventors: Kou-Long Tseng, Hsinchu; Chien-Chin Chan, ChuPei; Guang-Shang Chang, Taichung; Chin-Shui Lin, YungHo; Chih-Wen Pan, Taipei; Chi-Wen Lin, Hsinchu, all of Taiwan

[73] Assignee: Umax Data Systems, Inc., Hsinchu, Taiwan

[21] Appl. No.: 09/017,119

[22] Filed: Jan. 31, 1998

[51] Int. Cl.⁶ .................................................... G03B 17/00
[52] U.S. Cl. ............................ 396/428; 348/369; 359/814
[58] Field of Search ................................ 396/20, 55, 419, 396/420, 424, 427, 428; 352/69, 243; 348/369; 359/557, 813, 814

[56] References Cited

U.S. PATENT DOCUMENTS

| | | | |
|---|---|---|---|
| 4,937,675 | 6/1990 | Starceski et al. | 348/369 X |
| 5,463,432 | 10/1995 | Kahn | 396/428 X |
| 5,502,598 | 3/1996 | Kimura et al. | 359/814 |
| 5,794,081 | 8/1998 | Itoh et al. | 396/55 |

*Primary Examiner*—Howard B. Blankenship
*Attorney, Agent, or Firm*—W. Wayne Liauh

[57] ABSTRACT

A moveable lens apparatus for digital camera includes a CCD lens set, a first motion mechanism having a bracket pivotally holding the lens set and a first gear set for driving the bracket and the lens set to rotate left or right angularly, and a second motion mechanism having a guide slidably engageable with a rear end of the lens set, a gear rack vertically attached to the guide and a second gear set for driving the gear rack and the guide up or down so that the lens set may be swung pivotally up or down. The first and second gear set may be actuated manually or by motors. The lens set thus may be moved and rotated smoothly and precisely without a user's hand directly touching the lens set.

13 Claims, 2 Drawing Sheets

MOVEABLE LENS APPARATUS FOR DIGITAL CAMERA

BACKGROUND OF THE INVENTION

1. Field of the Invention

This invention relates to a moveable lens apparatus for digital camera (e.g., CCD camera) and particularly to a moveable lens apparatus for digital camera that can move the camera lens freely and precisely within a certain angular range.

2. Description of the Prior Art

Conventional digital camera such as the one disclosed in U.S. Pat. No. 5,612,732 includes a moveable CCD camera lens which can rotate about a shaft (i.e., an one dimensional axis rotation). During operation of the CCD camera, a user has to use hand to move the lens directly. Such an aspect generally results in the following disadvantages:

1. The lens is prone to smear by the hand, and thus may result in poor image quality.
2. Adjustment by hand could easily be overdone with too strong force and is prone to damage the lens mechanism. Hand movement also creates vibration or dislocation of the camera, and makes fine tuning and precise positioning of the lens difficult.

Because of aforesaid shortcomings, conventional digital camera is mostly used in relatively low price product category. It is not suitable for high value products which require clean lens and precise fine tuning function.

SUMMARY OF THE INVENTION

It is a primary object of this invention to provide a moveable lens apparatus for digital camera so that the lens may be moved and fine-tuned easily up or down, and left or right without a user using hand to move the lens directly.

According to one aspect of this invention, there is provided with a control button for actuating two motors. The first motor drives a first motion mechanism which includes a bracket pivotly supports the lens and a first gear set engaged with the first motor. The first motion mechanism provides transverse (i.e., left or right) angular movement of the lens. The second motor drives a second motion mechanism which includes a transverse guide, a gear rack and a second gear set for moving the lens in vertical angular position (i.e., up or down). Pushing the control button, the lens may be easily moved and fine-tuned angularly left or right, up or down without user's hand touching the lens.

According to another aspect of this invention, there is provided with two motion mechanisms with two gear sets for actuating the lens to move in two dimensional axes. The first motion mechanism includes a bracket pivotly supports the lens and a first gear set for driving the bracket and the lens to rotate left or right angularly. There is a first actuating gears in the first gear set that has a portion extending out of the camera case to enable user's hand to turn the first actuating gear and consequently the bracket and the lens to rotate transversely. The second motion mechanism includes a transverse guide, a gear rack and a second actuating gear which has a portion extending out of the camera case. By turning the second actuating gear, the gear rack and the guide will be moved up or down and thus move the lens upward or downward angularly.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
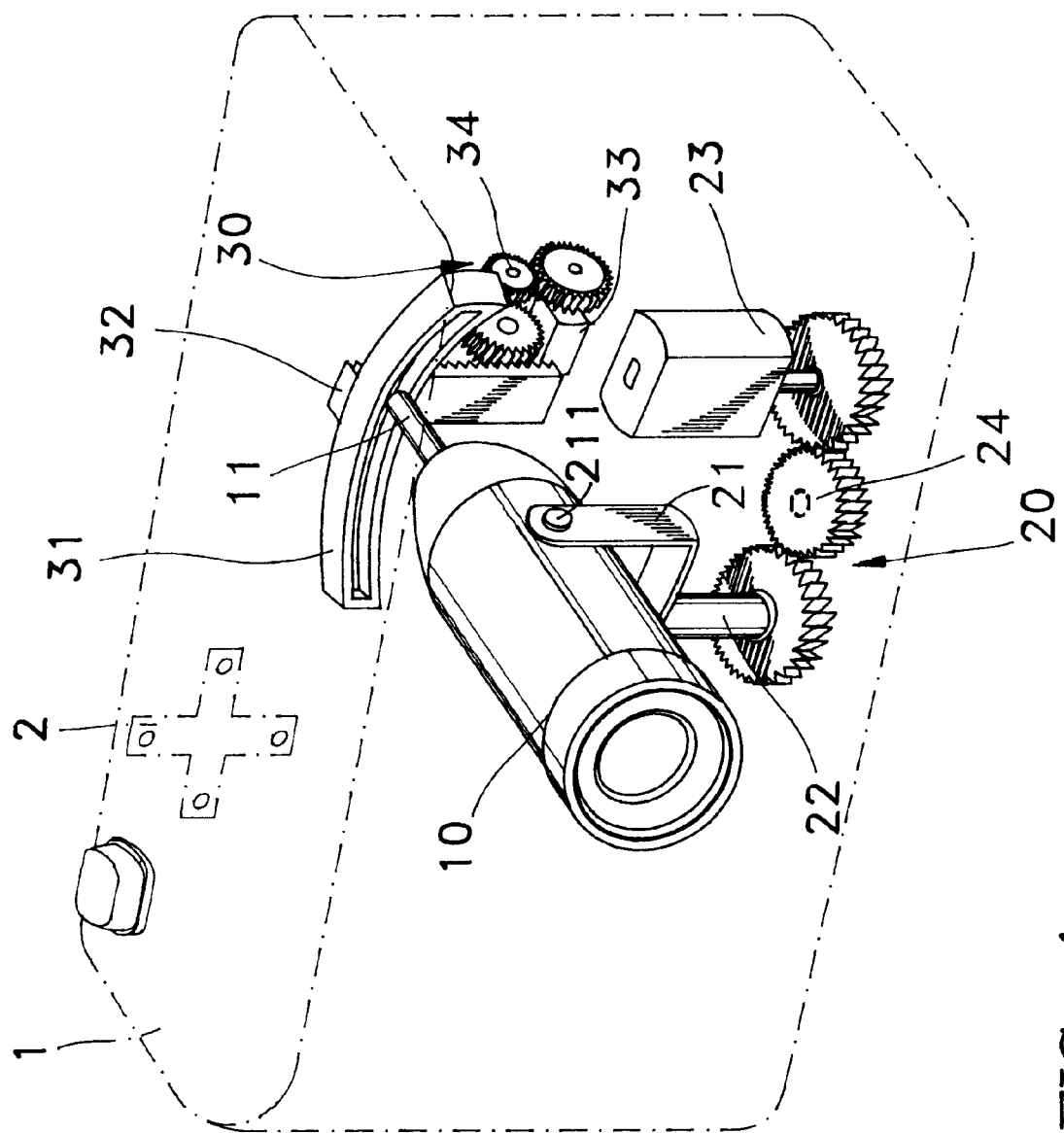
FIG. 1 is a perspective view schematically showing a first embodiment of this invention.

FIG. 1 shows a first embodiment of the moveable lens apparatus for a camera 1, preferably a digital camera, according to this invention. It includes a lens set 10, a first motion mechanism 20 for moving the lens set 10 in angular transversely, a second mechanism 30 for moving the lens set 10 in angular vertically, and a control button 2 for controlling the first and second motion mechanisms 20 and 30. All of this are housed within a camera case.

The lens set 10 includes a composite lens unit and a charged couple device (CCD) (not shown in the figures) for capturing and transforming outside objects into an image and digital signals. The lens set 10 is furnished inside the case of the camera 1 while having a front end thereof extending out of the camera 1. The first motion mechanism 20 includes an U-shaped bracket 21 for holding the lens set 10, a first gear set 24 which may be a reduction gear and a motor 23 for driving the first gear set 24. The lens set 10 is pivotally held by the bracket 21 via two pivotal studs 211 located on two lateral sides thereof such that the lens set 10 is capable to swing vertically about the studs 211 in a limited degree. The bracket 21 further has a vertical shaft 22 extending downward to engage with the first gear set 24. Therefore when the motor 23 is activated and drives the first gear set 24, the bracket 21 and consequently the lens set 10 will be rotated transversely left or right.

The second motion mechanism 30 includes a transverse guide 31 in curved shape with a groove inside allowing an end of a bar 11 extending from the rear end of the lens set 10 to slide therein transversely, a gear rack 32 vertically attached to the guide 31 in substantially a "T" shape manner, a second gear set 34 which may be a reduction gear and a second motor 33 engaging with the second gear set 34. When the second motor 33 is activated and drives the second gear set 34 to rotate, the gear rack 32 and the guide 31 will be moved vertically up or down, consequently the lens set 10 will be swung angularly up or down about the pivotal studs 211. The gear rack 32 may have a pair of stoppers (not shown in the figures) disposed at both ends thereof to limit the up or down movement location of the guide 31. Both ends of the guide 31 may be closed to limit the transverse rotation angle of the lens set 10.

The control button 2 may be a cross-shaped button located on the outside surface of the camera case and is wired to the first and second motors 23 and 33. Upon pressing the control button 2, the motors 23 and 33 will be actuated to rotate in a desired direction transversely or vertically, so that the lens sets 10 may be directed to an angular position desired. The lens set thus may be adjusted to a desired angle without user's hand touching lens set directly.

Figure 2:
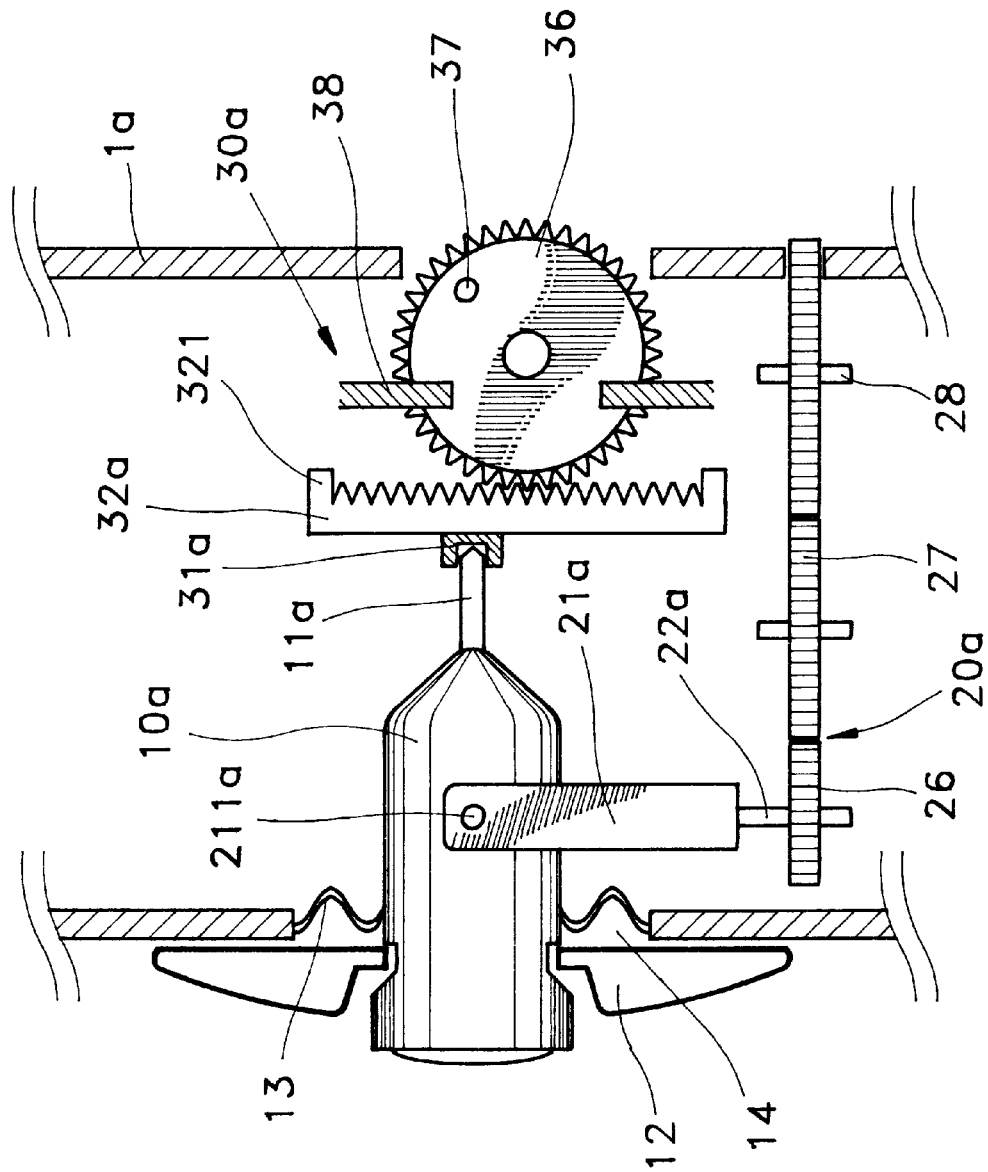
FIG. 2 is a sectional view schematically showing a second embodiment of this invention.

FIG. 2 illustrates a second embodiment of this invention that is manually driven instead of motor-driven. Equivalent components as shown in FIG. 1 will be indicated by same numerals. The moveable lens set apparatus includes a lens set 10a which has a composite lens unit and a CCD located therein, a first motion mechanism 20a for driving the lens set 10a to rotate angularly left or right, and a second motion mechanism 30a for driving the lens set 10a to rotate angularly up or down.

The first motion mechanism 20a includes an U-shaped bracket 21a for pivotally holding the lens set 10a between a pair of pivotal studs 211a, and transmission gears 26, 27 and 28. The bracket 21a has a shaft 22a vertically extending downward for engaging with the gear 26. The gear 28 is the first actuating gear which has a portion extending out of the camera case 1a. Therefore when a user turns the gear 28 by hand, the gear 26, the shaft 22a and the bracket 21a will be driven to rotate angularly left or right, consequently the lens set 10a will also be moved left or right simultaneously.

The second motion mechanism 30a includes a transverse guide 31a with a groove inside for slidably engaging with an end of a bar 11a extending from the rear end of the lens set 10a, a gear rack 32a vertically attached to the guide 31a and a second actuating gear 36 which is engaged with the gear rack 32a. The second actuating gear 36 has a portion extending out of the case of the camera 1a. Therefore when a user turns the second actuating gear 36 by hand, the gear rack 32a and the guide 31a will be moved up or down, consequently the lens set 10a will be moved up or down angularly about the pivotal studs 211a. At both ends of the gear rack 32a, there may be provided with protrusive stoppers 321 as rotation limit of the second actuating gear 36, so that the guide 31a and the end of the bar 11a will always engage. The second actuating gear 36 may also have a bulge 37 which will hit a stopping block 38 which is fixed to the camera case 1 and stop the rotation of the gear 36 at a preset angle. In addition, both ends of the guide 31a may also be closed to limit the transverse rotation angle of the lens set 10a.

The camera case 1a has a front opening 14 to allow the lens set 10a to be disposed therein. The front end of the lens set 10a extends out of the camera case 1a from the front opening 14 and is able to move freely. An annular ring 12 which has a larger diameter than the opening 14 may be disposed around the lens set 10a at a position outside the camera case 1a. The annular ring 12 is coupled with the lens set 10a in such a manner that it will neither separate from the lens set 10a nor obstruct movement of the lens set 10a. In addition, the annular ring 12 is large enough that it is capable to keep covering the opening 14 no matter the lens set 10a is moved to which position of the opening 14. A bellows 13 made of soft membrane (such as soft cloth or soft plastic sheet or the like) may be disposed in the gap formed between the opening 14 and the lens set 10a. Both the annular ring 12 and bellows 13 are used to prevent outside dusts or dirts from entering into the camera.

It is to be understood that the descriptions and preferred embodiments set forth above are only to serve for illustrative purpose, and do not intent to limit the scope of the present invention. Various changes and modifications may be made without departing from the scope of the present invention.

For example the location of the lens set and motors may be set at any desirable positions rather than the ones shown in FIG. 1. The location of the first and second motion mechanisms shown in FIG. 1 may also be placed wherever suitable within the camera case.

As a summary, this invention provides a simple and effective mechanism which enables a user to adjust and fine tune the lens set of a digital camera to a desired angle and a precise position easily and conveniently without directly moving the lens set by hand.

While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

We claim:

1. A moveable lens apparatus for digital camera comprising;

a camera case;

a lens set furnished within the camera case, said lens set having a front end thereof extending out of the camera case;

a first motion mechanism including a bracket for pivotally holding the lens set, a first gear set having at least a first gear engaging with a shaft vertically located under the bracket and a second gear, and a first motor engaging with the second gear for driving the bracket and the lens set rotating about the shaft in a transverse direction; said lens set being pivotally engaged with said bracket and capable to swing vertically in a limited degree; and a second motion mechanism including a transverse guide slidably engageable with a rear end of the lens set, a gear rack vertically attached to the guide, a second gear set enageable with the gear rack, and a second motor for driving the second gear set to move the gear rack, the guide and the rear end of the lens set vertically, and to swing the lens set vertically.

2. A moveable lens apparatus of claim 1, wherein the first and second gear sets are reduction gears.

3. A moveable lens apparatus of claim 1, wherein the bracket is formed in U-shape and pivotally holds the lens set at two lateral sides at substantially the middle portion of the lens set, the shaft extending downward of the bracket to engage with the first gear set for rotating the lens set transversely.

4. A moveable lens apparatus of claim 1, wherein the lens set has a bar extending out from the rear end of the lens set, one end of the bar being slidably engageable with the guide, the guide having a curved shape to constantly engage with the bar when the lens set is being rotated transversely.

5. A moveable lens apparatus of claim 1, wherein the gear rack is attached to the guide in a middle portion thereof and forms a substantially T-shaped manner.

6. A moveable lens apparatus of claim 1 further having a control button located on the camera case for controlling the first and second motors.

7. A moveable lens apparatus of claim 1, wherein the camera case has a front opening to enable the front end of the lens set to move freely therein and an annular ring around the front end of the lens set with a larger diameter than the front opening for covering the front opening.

8. A moveable lens apparatus of claim 7 further having a bellows made of soft membrane located between the lens set and the front opening for preventing outside dust from entering into the camera case.

9. A moveable lens apparatus for digital camera comprising:

a camera case;

a lens set furnished within the camera case, said lens set having a front end thereof extending out of the camera case;

a first motion mechanism including a bracket for pivotally holding the lens set and a first gear set having at least a gear engaging with a shaft vertically fixed to the bracket and a first actuating gear partly extending outside the camera case for actuating the bracket and the lens set to rotate about the shaft in a transverse direction; said lens set being pivotally engaged with said bracket and capable to swing vertically in a limited degree ; and a second motion mechanism including a transverse guide slidably engageable with a rear end of the lens set, a gear rack vertically attached to the guide, and a second actuating gear engageable with the gear rack, the second actuating gear having a portion extending outside the camera case for actuating the gear rack and the guide to move vertically, and to swing the lens set vertically.

10. A moveable lens apparatus of claim 9, wherein the gear rack has two stoppers at both ends for limiting vertical swinging range of the lens set; the guide having two closed ends for limiting transverse rotation of the lens set.

11. A moveable lens apparatus of claim 9, wherein the second actuating gear has bulges disposed thereon for hitting stopping blocks formed on the camera case and stopping the second actuating gear from continuously rotating beyond a predetermined angle.

12. A moveable lens apparatus of claim 9, wherein the camera case has a front opening to enable the front end of the lens set to move freely therein and an annular ring around the front end of the lens set with a larger diameter than the front opening for covering the front opening.

13. A moveable lens apparatus of claim 9 further having a bellows made of soft membrane located between the lens set and the front opening for preventing outside dirt from entering into the camera case.

* * * * *